3,843,519
patented Oct. 22, 1974

3,843,519
INHIBITING GROWTH OF MICROORGANISMS IN AQUEOUS SYSTEMS

Milton Manowitz, Fair Lawn, Frederick H. Sharpell, Jr., Pequannock, and Carolyn Stegmann, Dumont, N.J., assignors to Givaudan Corporation, Clifton, N.J.
No Drawing. Filed June 6, 1973, Ser. No. 367,623
Int. Cl. C02b 3/08
U.S. Cl. 210—64          8 Claims

ABSTRACT OF THE DISCLOSURE

A method for inhibiting the detrimental growth of microorganisms in aqueous systems susceptible to such growth, and particularly, aqueous systems wherein there is introduced into such systems a microorganism growth inhibiting amount of 2 - (2 - hydroxypropyl) - 6 - methyl-1,3-dioxan-4-ol (paraldol).

BACKGROUND OF THE INVENTION

1. Field of the Invention

This invention relates to the treatment of various aqueous systems, particularly aqueous systems which are admixed with organic compounds in the form of solutions, water-oil emulsions, dispersions and the like. More particularly, the invention relates to a novel method for the destruction or inactivation of microorganisms, etc., in contact with waters, aqueous solutions, emulsions and dispersions.

2. The Prior Art

The presence of bacteria or other microorganisms in aqueous systems used in industry creates serious problems. Such microorganisms cause the formation of sludge, slime and other materials which tend to clog openings through which the particular aqueous system passes. For example, cutting oil fluid emulsions are used to cool and lubricate the surfaces which are being cut and shaped by the tool or abrasive. Such coolant materials are usually expelled from an orifice onto the surface being cut. If this orifice becomes clogged even for short periods of time by the formation of sludge caused by bacteria or other microorganisms, the stoppage of coolant causes overheating and undesired friction which interferes seriously with the cutting operation.

In the formulation of cutting fluids as well as cosmetic formulations, latex paints, polymer emulsions, adhesives, fiber lubricants, and pigment dispersions, it is critical to their acceptability that the emulsion or dispersion be stable and emulsion degradation be prevented. Such emulsion degradation is often caused by microbial activity and is generally accompanied by discoloration, changes in pH and noxious odors which completely destroys the utility of such formulations.

One of the most acute industrial biological control problems is in papermill water systems which contain aqueous dispersions of paper-making fibers commonly referred to as "white waters." The uncontrolled build-up of microbiological slime due to the accumulation of microorganisms, causes off-grade production, increased maintenance costs and excessive raw material usage. Chemical control of these microorganisms will obviate the problems recited above. Application of an effective antimicrobial agent to strategic locations throughout the paper-making process will achieve good control and do away with potentially troublesome conditions.

In order to overcome the problems created by the presence of sludge and slime in aqueous fluid systems, industry has for a long time been seeking microbial control agents which will keep sludge and slime formation in abeyance by inhibiting its growth.

Many chemical compounds have been recommended or used as anti-microbial agents for aqueous systems but often have proven to be ineffective in these applications or unsatisfactory due to color, compatibility, stability or similar problems. In recent years, the importance of toxicological and ecological properties of anti-microbials has become increasingly prominent and various known active biocides can no longer be used for these applications due to their high toxicity and/or resistance to biodegradation. Therefore, in addition to efficacy and physical compatibilities, biodegradability and relatively low toxicity also are important requirements for an anti-microbial agent to be used in aqueous systems.

SUMMARY OF THE INVENTION

In accordance with the present invention, there is provided a method for inhibiting the detrimental growth of microorganisms in an aqueous medium susceptible to such growth wherein there is introduced into the medium a microorganism growth inhibiting amount of 2-(2-hydroxypropyl)-6-methyl-1,3-dioxan-4-ol.

The compound 2 - (2 - hydroxypropyl) - 6-methyl-1,3-dioxan-4-ol has the formula

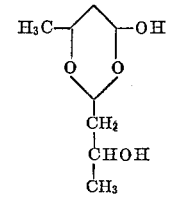

and is otherwise referred to in the art as paraldol.

Paraldol has unexpectedly been found to be effective for the protection of any non-sterile aqueous system against a broad spectrum of microorganisms that attack such systems and is compatible with these systems. Paraldol has relatively low toxicity ($LD_{50}$ 1.0 g./kg. in rats) and is biodegradable.

PREFERRED EMBODIMENTS

In general, concentrations of from about 0.025 to about 1% by weight of paraldol, based on the weight of the aqueous system or medium to be protected are satisfactory. Normal requirements for most aqueous fluid systems are concentration levels of 0.025 to 0.25% by weight of the system.

The method of the present invention may be practiced by adding paraldol to the aqueous system in any suitable manner. For example, it may be incorporated into formulations such as cutting oils, cosmetics, latex paints, at any stage during the preparation of these formulations. It may be added to solid, nonaqueous liquid, or to the aqueous phase of these formulations during their preparation. Paraldol may be added neat or as a solution in a suitable solvent such as methanol, ethanol, acetone, dimethylformamide, or propylene alcohol. Paraldol is effective in both acid and basic compositions and in the presence of nonionic, anionic, and cationic surfactants.

Specific examples illustrating the invention are set out as follows:

EXAMPLE I

The efficacy of paraldol as an antimicrobial agent for cutting oil emulsions was demonstrated by the following test:

Varying aliquots of a 5% solution of paraldol in ethanol were added to cutting oil emulsions prepared by diluting a commercially available cutting oil concentrate sold under the tradename Kutwell 30, both 1 to 30 and 1 to 100 with water. These samples were inoculated with a culture of *Pseudomonas aeruginosa* and incubated at 28° C. on a rotary shaker.

At weekly intervals the samples were examined for microorganisms then reinoculated and incubated. The results of these tests are summarized in Table I below.

TABLE I

| Cutting oil-water ratio | Minimum inhibitory concentration range (µg./ml.) incubation period (weeks) | | |
|---|---|---|---|
| | 1 | 2 | 3 |
| 1/30 | 125–250 | 125–250 | 250–500 |
| 1/100 | 250–500 | 250–500 | 250–500 |

EXAMPLE II

Varying concentrations of paraldol were introduced from ethanol solution into three different cosmetic lotions, composed primarily of emollients, moisturizers and emulsifying agents. The lotions differed in composition and percent water in their formulation. The lotions were inoculated with cultures of both *Pseudomonas aeruginosa* and *Aspergillus niger* and incubated at 28° C. for a four week period with weekly reinoculations of the test organisms. The results of examinations of these samples are tabulated as the lowest concentration of paraldol inhibiting growth of the organisms after four weeks. The results are recorded in Table II below.

TABLE II

| Lotion | Minimum inhibitory concentration (µg./ml.) | | |
|---|---|---|---|
| | I | II | III |
| Ps. aeruginosa | 250 | 125 | 250 |
| A. niger | 2,000 | 2,000 | 2,000 |

EXAMPLE III

The utility of paraldol as a slimicide for pulp and paper mill water systems was demonstrated by the following study:

Various quantities of an 8% solution of paraldol in methanol were incorporated into a test substrate composed as follows:

| | | |
|---|---|---|
| Whatman No. 2 homogenized filter paper (powdered cellulose) | g | 8.4 |
| Distilled H$_2$O | ml | 990 |
| Sodium Nitrate | g | 2.6 |
| Calcium sulfate (pearl filler) | g | 1.0 |
| Maltose, Tech. | g | 6.5 |
| Nutrient Broth | g | 1.0 |
| 3% Mersize RM 7OR (Monsanto) | ml | 10.0 |
| 2% Alum (Al$_2$(SO$_4$)$_3$) ph 5.8–6.0 | ml | 2.5 |

The samples were inoculated with 4 different organisms and incubated at 28° C. At weekly intervals the samples were examined for the presence of growth and then reinoculated during a total incubation period of 4 weeks. The results are summarized in Table III below.

TABLE III

| Incubation period (weeks) | PS. aeruginosa | | | | A. aerogenes | | | | A. niger | | | | P. piscarium | | | |
|---|---|---|---|---|---|---|---|---|---|---|---|---|---|---|---|---|
| | 1 | 2 | 3 | 4 | 1 | 2 | 3 | 4 | 1 | 2 | 3 | 4 | 1 | 1 | 3 | 4 |
| Concentration (µg./ml.): | | | | | | | | | | | | | | | | |
| 2,000 | − | − | − | − | − | − | − | − | − | − | − | − | − | − | − | − |
| 1,000 | − | − | − | − | − | − | − | − | − | − | + | + | − | − | − | − |
| 500 | − | − | − | − | − | − | − | − | − | − | + | + | − | − | − | − |
| 250 | + | + | + | + | + | + | + | + | + | + | + | + | − | − | − | − |
| Control | + | + | + | + | + | + | + | + | + | + | + | + | + | + | + | + |

NOTE: + = growth; − = no growth.

EXAMPLE IV

The utility of paraldol as an anti-microbial agent for polymer emulsions was demonstrated by tests using a W. R. Grace Latex emulsion system that had been fortified with nutrient broth. The emulsion samples containing various levels of paraldol was inoculated with *Ps. aeruginosa* and *Escherichia coli* and incubated at ambient temperature. The samples were examined weekly for growth and then reinoculated with test organisms during a 4 week period. The results are recorded in Table IV below.

TABLE IV

| Incubation period (weeks) | Ps. aeruginosa | | | | E. coli | | | |
|---|---|---|---|---|---|---|---|---|
| | 1 | 2 | 3 | 4 | 1 | 2 | 3 | 4 |
| Concentration (µg./ml.): | | | | | | | | |
| 2,000 | − | − | − | − | − | − | − | − |
| 1,000 | − | − | − | − | − | − | − | − |
| 500 | − | − | + | + | − | − | − | − |
| 250 | − | − | + | + | − | − | − | − |
| 125 | − | + | + | + | − | − | − | − |
| 62.5 | − | + | + | + | − | − | − | − |
| Control | + | + | + | + | + | + | + | + |

NOTE: + = growth; − = no growth.

What is claimed is:

1. The method of inhibiting the detrimental growth of microorganisms in an aqueous medium susceptible to such growth which comprises incorporating in the aqueous medium from about 0.025 to about 1% by weight of 2-(2-hydroxypropyl)-6-methyl-1,3-dioxan-4-ol.

2. The method of claim 1 wherein the aqueous medium is a cutting oil.

3. The method of claim 1 wherein the aqueous medium is a cosmetic formulation.

4. The method of claim 1 wherein the aqueous medium is process water used in paper manufacture.

5. The method of claim 1 wherein the aqueous medium is a latex paint.

6. The method of claim 1 wherein the aqueous medium is a polymer emulsion.

7. The method of claim 1 wherein the aqueous medium is a fiber lubricant.

8. The method of claim 1 wherein the aqueous medium is a pigment dispersion.

References Cited

UNITED STATES PATENTS

| | | | |
|---|---|---|---|
| 3,629,465 | 12/1971 | Manowitz et al. | 210—64 |
| 3,196,071 | 7/1965 | Smith et al. | 424—278 |

OTHER REFERENCES

The Structure of Paraldol, Vogel et al., J. Org. Chem. 31(6), 1775–80 (1966) (Eng.).

SAMIH N. ZAHARNA, Primary Examiner

B. CASTEL, Assistant Examiner

U.S. Cl. X.R.

424—278; 71—67; 106—15 AFR; 162—161